Dec. 4, 1951  D. S. GREER  2,577,722
COATING MACHINE
Filed May 13, 1950  2 SHEETS—SHEET 1

INVENTOR.
Don S. Greer
BY Rowland V. Patrick
ATTORNEY

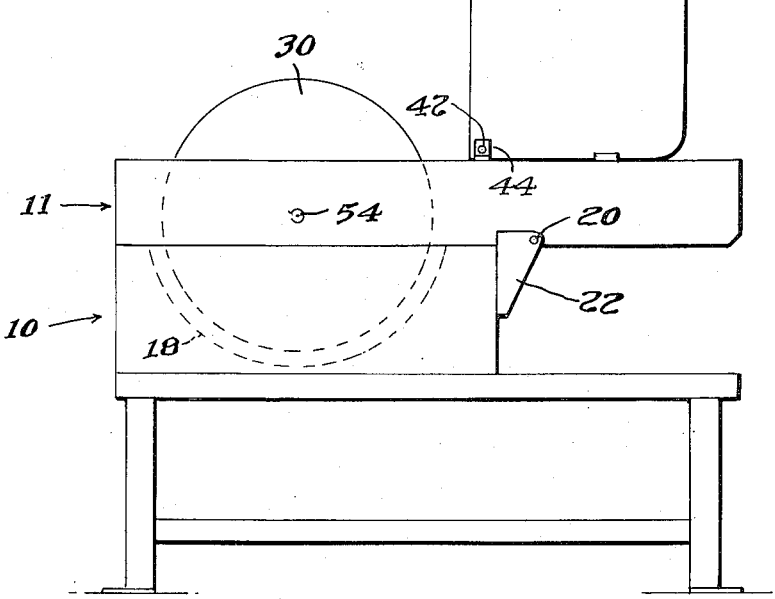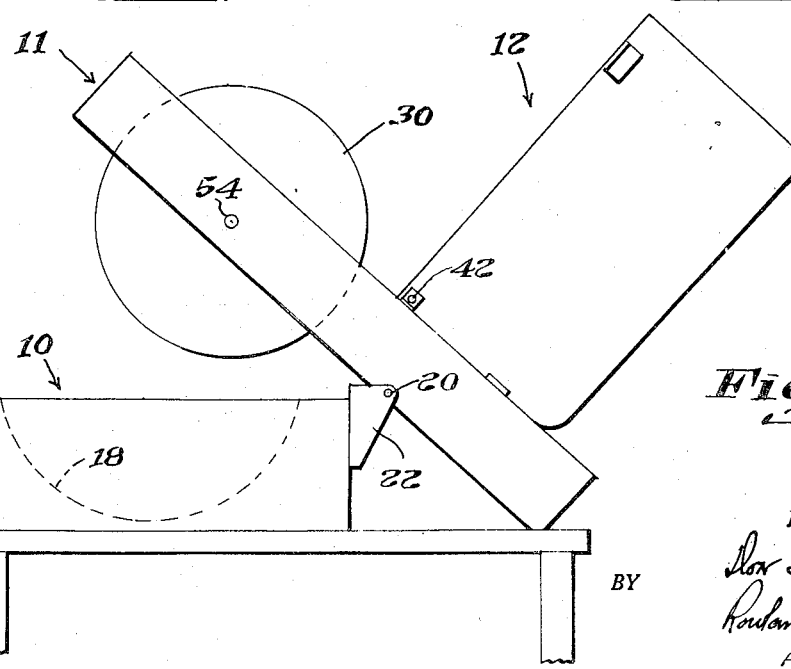

Patented Dec. 4, 1951

2,577,722

UNITED STATES PATENT OFFICE 2,577,722

COATING MACHINE

Don S. Greer, Winchester, Mass., assignor to J. W. Greer Company, Cambridge, Mass., a corporation of Massachusetts Application May 13, 1950, Serial No. 161,821

3 Claims. (Cl. 91—3)

This invention relates to coating machines and particularly to food coating machines, for example, candy coating machines and has for an object the provision of a coating machine structure which lends itself to better cleanliness than any heretofore provided.

A typical candy coating machine, of the type intended to coat candy centers with chocolate coatings, comprises a tank over which passes a wire or otherwise foraminous conveyor, usually in the form of an endless belt. The tank is adapted to contain, usually at an elevated temperature, a chocolate coating mix. Into this mix extends some sort of mechanism for transferring the mix continuously from the tank to a distributor located over the belt. Thus, as individual candies, spaced along the belt on the upper traverse thereof, are fed through the machine, the mix cascades over the candies from the distributor and the excess returns through the belt to the tank which thus acts as a reservoir.

Because of the compactness of the machines and the desirability of total enclosure both for cleanliness and for heat conservation purposes, the moving and stationary parts have such close clearance that considerable disassembly of the machine has always been necessary to give the tank any thorough cleaning.

Thus the belt would have to be disconnected and often the coating transfer mechanism removed. Since health authorities demand periodic cleaning, such disassembly caused lengthy work stoppage.

According to this invention, a coating apparatus of the above type is so constructed that cleaning of the tank, as well as all the other parts of the machine, is greatly facilitated, requiring in its preferred form, only a simple disconnection of the drive and simple movement of certain components of the machine to cleaning positions exposing all the various parts to easy cleaning access.

My invention is shown in the accompanying drawings embodied in a typical candy coating apparatus wherein:

Fig. 3 is a side elevational view corresponding to that shown in Fig. 1, but omitting most of the moving parts so as to clarify the motion of the components of the structure to cleaning positions; and Fig. 4 is a view of the parts shown in Fig. 3 moved to a further and second cleaning position.

Figure 2:
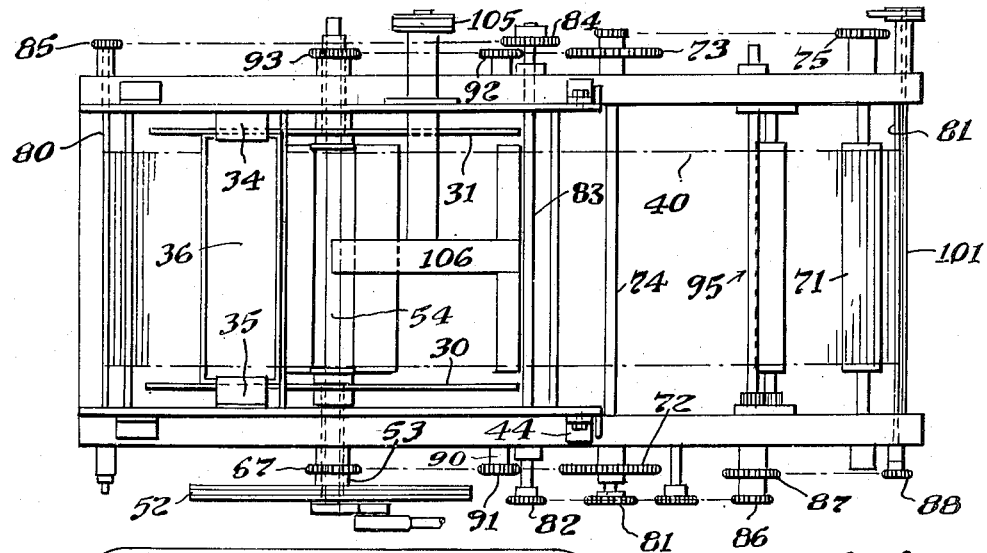
Fig. 2 is a plan view thereof.
Figure 1:
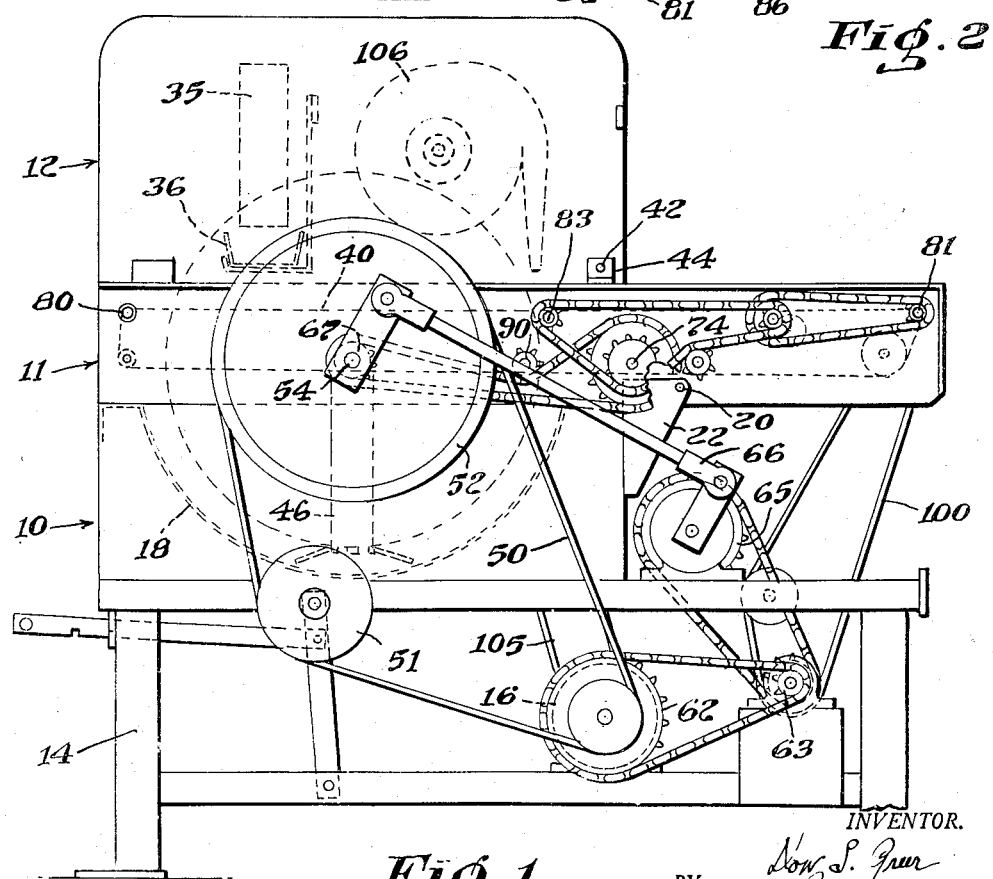
Fig. 1 is a side elevational view of the apparatus.

As shown in Figs. 1, 3 and 4, the coating machine of this invention comprises three independent superposed structural components, namely a bottom structure generally indicated at 10, an intermediate elongated structure generally indicated at 11 and a superstructure generally indicated at 12.

The bottom structure 10 includes suitable supporting legs 14 and a driving motor 16. It also supports a semicylindrical tank 18 designed to hold a liquid coating material.

The intermediate structure 11 rests upon structure 10 and is connected thereto by means of pivots 20 carried in side brackets 22 fast on the frame of structure 10.

The intermediate structure 11 supports two discs 30 and 31, one on either side, which extend into the tank 18 and act in cooperation with scrapers 34 and 35 to transfer coating material continuously from the tank 18 into a distributor pan 36 which is removably suspended across the superstructure 12. The intermediate structure 11 also carries an endless foraminous belt 40 extending the length thereof.

The superstructure 12 containing the distributor pan 36 rests on the intermediate structure 11 and is connected thereto by pivots 42 carried in side brackets 44 mounted on the frame structure 11.

As shown in Fig. 3, it is thus possible for the superstructure to be pivoted upwardly from its horizontal position, as shown in Fig. 1, to a cleaning position, as shown in Fig. 3, and for the intermediate structure 11 to be pivoted from its horizontal position, as shown in Fig. 1, to a cleaning position as shown in Fig. 4.

With the parts in the position of Fig. 4, it can be readily seen that easy access is given to each element of the machine for cleaning.

Moreover, the drive for the coating transfer mechanism including the discs 34 and 35, for an agitator 46 contained in the tank and for the conveyor belt 40, is so designed that the movement of the three component structures 10, 11 and 12 as previously described may readily take place with disconnection of only two belts. To this end, the disc 30 is driven from motor 16 by a belt 50 carried around a tensioning pulley 51 to a pulley 52 carried by a sleeve 53 rotatably mounted on transverse shaft 54. Disc 30 is fixed on the inner end of sleeve 53. Agitator 46 which is fixed to shaft 54 is oscillated from the motor 16 through sprockets 62, 63 and 65 all mounted on the lower structure 10 and a crank 66.

All the conveyor drive mechanism is mounted on the intermediate structure 11 and is driven from a sprocket 67 fast on sleeve 53. Thus, the wire belt 40 is driven by a belt drive roll 71 driven from sprocket 67 through sprockets 72, 73 on shaft 74, and sprocket 75.

Belt turnover rods 80 and 81 are also mounted on the intermediate frame 11, rod 80 being driven from shaft 74 through sprockets 81, 82, cross-shaft 83, sprockets 84, 85 and rod 81 being driven from shaft 74, sprocket 81 through sprockets 86, 87 and 88. Sprocket 67 also drives a transverse shaft 90 through sprocket 91 so that the drive for the disc 30 is carried transversely of the machine through sprockets 92 and 93 to drive disc 31.

95 generally indicates a bottoming roll mechanism which is also mounted on the intermediate structure 11.

Besides the belt 50, the only other driving connections between the three structures is the crank drive for the agitator 46, a belt drive 100 for a rod 101 which rotates in opposite direction to the rotation of the turnover shaft 81 adjacent thereto, and a belt 105 which operates a blower 106 suspended in the superstructure 12.

To prepare the parts for movement to the cleaning position shown in Fig. 4, it is only necessary to disconnect the belts 50 and 105, the pivotal movement of structure 11 being free since the crank is then free and the belt 100 is slackened off by the pivotal movement.

The parts are so designed that the center of gravity of the combined structures 11 and 12 is near the pivot 20 so that the two combined structures 11 and 12 are very easily pivoted into the position of Fig. 4.

I claim:

1. In coating apparatus having a conveyor for transporting articles to be coated, a tank disposed beneath said conveyor for holding liquid coating material, a coating material distributor disposed above said conveyor, a frame for said tank, a frame for said conveyor resting on said tank frame, and a frame for said distributor resting on said conveyor frame, said distributor frame having adjacent one end thereof a pivotal connection with said conveyor frame, said pivotal connection having a horizontal axis so that the conveyor frame may be pivoted about a horizontal axis from its position resting on said conveyor frame to an elevated position exposing said conveyor, and said conveyor frame having at its lower portion and at a point intermediate its ends a pivotal connection with the upper end portion of said tank frame, said last-mentioned pivotal connection having a horizontal axis so that the tank frame may be pivoted about a horizontal axis from its position resting on said tank frame to an elevated position exposing said tank.

2. A coating apparatus having a conveyor for transporting articles to be coated, a tank disposed beneath said conveyor for holding liquid coating material, a coating material distributor disposed above said conveyor, mechanism for transferring coating material contained in said tank to said distributor, a frame for said tank, a frame for said conveyor and transfer mechanism resting on said tank frame, a frame for said distributor resting on said conveyor frame, said distributor frame having adjacent one end thereof a pivotal connection with said conveyor frame, said pivotal connection having a horizontal axis so that the conveyor frame may be pivoted about a horizontal axis and said conveyor frame having at its lower portion and at a point intermediate its ends a pivotal connection with the upper end portion of said tank frame, said last-mentioned pivotal connection having a horizontal axis so that the tank frame may be pivoted about a horizontal axis, a motor mounted on said tank frame, driven means mounted on said conveyor frame drivingly connected to said transfer mechanism and said conveyor belt, a blower mounted on said distributor frame, a driving belt connecting said motor and said intermediate frame driven means and a driving belt connecting said motor and said blower, whereby said belts may be disconnected to permit said conveyor and distributor frames to be independently pivoted from their said resting positions to elevated positions permitting ready cleaning access to said conveyor and tank.

3. A coating apparatus as set forth in claim 2 further characterized in that the pivotal connection between said tank frame and said conveyor frame is positioned adjacent the combined center of gravity of said conveyor frame and said distributor frame.

DON S. GREER.

REFERENCES CITED

The following references are of record in the file of this patent:

UNITED STATES PATENTS

| Number | Name | Date |
|---|---|---|
| 1,750,865 | Segrin | Mar. 18, 1930 |